US005555068A

United States Patent [19]

Utagawa

[11] Patent Number: 5,555,068
[45] Date of Patent: Sep. 10, 1996

[54] CAMERA WITH IMPROVED LENS DRIVE DURING SWITCHING OF MULTIPLE FOCAL POINT DETECTION AREAS

[75] Inventor: Ken Utagawa, Yokohama, Japan

[73] Assignee: Nikon Corporation, Tokyo, Japan

[21] Appl. No.: 361,827

[22] Filed: Dec. 22, 1994

[30] Foreign Application Priority Data

Dec. 22, 1993 [JP] Japan .................................. 5-325030

[51] Int. Cl.$^6$ .................................................. G03B 13/36
[52] U.S. Cl. .................................................. 354/402
[58] Field of Search .................................. 354/400, 402, 354/406, 407, 408; 250/201.2, 201.7, 201.8

[56] References Cited

U.S. PATENT DOCUMENTS 5,128,705  7/1992  Someya et al. .................. 354/400
5,296,888  3/1994  Yamada ............................. 354/402

Primary Examiner—W. B. Perkey

[57] ABSTRACT

A camera having multiple focal point detection areas which are individually selectable to focus a subject in a respective, selected focal point detection area. The camera includes a photographic lens and a focus adjustment unit. The focus adjustment unit drives the photographic lens to focus the subject in a selected focal point detection area by (a) calculating a sequence of defocus amount corresponding, respectively, to sequential points in time, each defocus amount corresponding to a respective focal point detection area selected at the corresponding point in time, and (b) driving the photographic lens to focus the subject based on the sequence of defocus amounts, irrespective of whether the selected focal point detection area has been switched to a different focal point detection area during the sequential points in time.

24 Claims, 9 Drawing Sheets

CAMERA WITH IMPROVED LENS DRIVE DURING SWITCHING OF MULTIPLE FOCAL POINT DETECTION AREAS

BACKGROUND OF THE INVENTION

1. Field of the Invention

The present invention relates to a camera capable of driving a photographic lens by performing automatic focus detection in multiple focus detection regions and, more particularly, to providing a smooth, accurate drive of the photographic lens with automatic focus detection in multiple focus detection regions.

2. Description of the Related Art

Conventional cameras can automatically adjust the focal point of a photographic lens to determine an appropriate focus position of the photographic lens. Typically, automatic focus point adjustment is performed for a single focal point detection area located in the center of the viewfinder display. Single automatic focus (AF) servos and continuous AF servos have been used for such focal point adjustment operation.

With a single AF servo, the subject is brought into focus by detecting the focus position of the photographic lens in the focal point detection area and a "focus lock" is applied to prevent subsequent movements of the photographic lens. If a subject is in a location other than the center of the viewfinder display, the subject can be maintained in a state of focus by arranging the subject to be in the center of the viewfinder display, focusing the photographic lens, setting the focus lock, and then changing the composition in the viewfinder display with the focus lock set so that the subject is moved to a different portion of the viewfinder display. Thus, the focus is set to the distance of the subject, but, as desired by the photographer, the subject is no longer positioned in the center of the viewfinder display.

By contrast, a continuous AF servo operates to continuously execute focus point detection so that the photographic lens is driven as necessary to focus the subject. The camera detects a change in the focus position of the photographic lens due to the movement of the subject or a change in the composition in the viewfinder screen. Based on the detected change, the photographic lens is continuously driven to always maintain focus.

Moreover, conventional cameras are provided with automatic focal point adjustment for multiple focal point detection areas. Japanese Patent Publication HEI-1-279215 discloses such a camera in which respective focal point detection areas are selected by a photographer operating an area selection switch.

In conventional cameras provided with automatic focal point adjustment for multiple focal point detection areas, a smooth drive of the photographic lens is not provided since a new distance measurement (that is, a measurement of the distance from the camera to the subject) is performed each time the focal point detection area is switched to a new focal point detection area. No consideration is made of any distance measurement performed prior to switching to the new focal point detection area. Moreover, responsiveness is reduced if data must be obtained and stored for multiple distance measurements in order to obtain a new focus point after switching focal point detection areas.

For example, there is a high probability that unstable operations will arise and unnecessary drive of the photographic lens will be performed during continuous AF servo operations if the focus is switched from a first focal point detection area to a second focal point detection area and the distance to the subject in the first focal point detection area is significantly different from the distance to the subject in the second focal point detection area. Moreover, conventional cameras typically switch from one focal point detection area to a different focal point detection area by sequentially switching the focal point detection areas in a specific order. Thus, unsatisfactory operation can occur while the photographer switches through the various focal point detection areas in an attempt to locate a desired subject or a desired focal point detection area.

SUMMARY OF THE INVENTION

It is therefore an object of the present invention to provide a camera which smoothly drives the photographic lens with a continuous AF servo, even when switching areas among multiple focal point detection areas.

Objects of the present invention are achieved by providing a camera having first and second focal point detection areas which are individually selectable to focus a subject in the selected focal point detection area, the first focal point detection area initially being selected and, thereafter, the second focal point detection area being selected. The camera comprises a photographic lens and a focus adjustment unit. The focus adjustment unit (a) calculates a defocus amount corresponding to the first focal point detection area when the first focal point detection area is selected, (b) drives the photographic lens in accordance with the defocus amount corresponding to the first focal point detection area to focus the subject in the first focal point detection area when the first focal point detection area is selected, (c) calculates a defocus amount corresponding to the second focal point detection area when the second focal point detection area is selected, and (d) controls the drive of the photographic lens to focus the subject in the second focal point detection area when the second focal point detection area is selected, based on the defocus amount calculated for the first focal point detection area and the defocus amount calculated for the second focal point detection area.

Moreover, objects of the present invention are achieved by providing a camera in which the focus adjustment unit does not drive the photographic lens to focus the subject in the second focal point detection area when the defocus amount corresponding to the first focal point detection area and the defocus amount corresponding to the second focal point detection area are separated by more than a predetermined value.

Objects are also achieved by providing a camera having multiple focal point detection areas which are individually selectable to focus a subject in a respective, selected focal point detection area. The camera comprises a photographic lens and a focus adjustment unit. The focus adjustment unit drives the photographic lens to focus the subject in a selected focal point detection area by (a) calculating a sequence of defocus amount corresponding, respectively, to sequential points in time, each defocus amount corresponding to a respective focal point detection area selected at the corresponding point in time, and (b) driving the photographic lens to focus the subject based on the sequence of defocus amounts, irrespective of whether the selected focal point detection area has been switched to a different focal point detection area during the sequential points in time.

BRIEF DESCRIPTION OF THE DRAWINGS

These and other objects and advantages of the invention will become apparent and more readily appreciated from the following description of the preferred embodiments, taken in conjunction with the accompanying drawings, of which.

DESCRIPTION OF THE PREFERRED EMBODIMENTS

Figure 1:
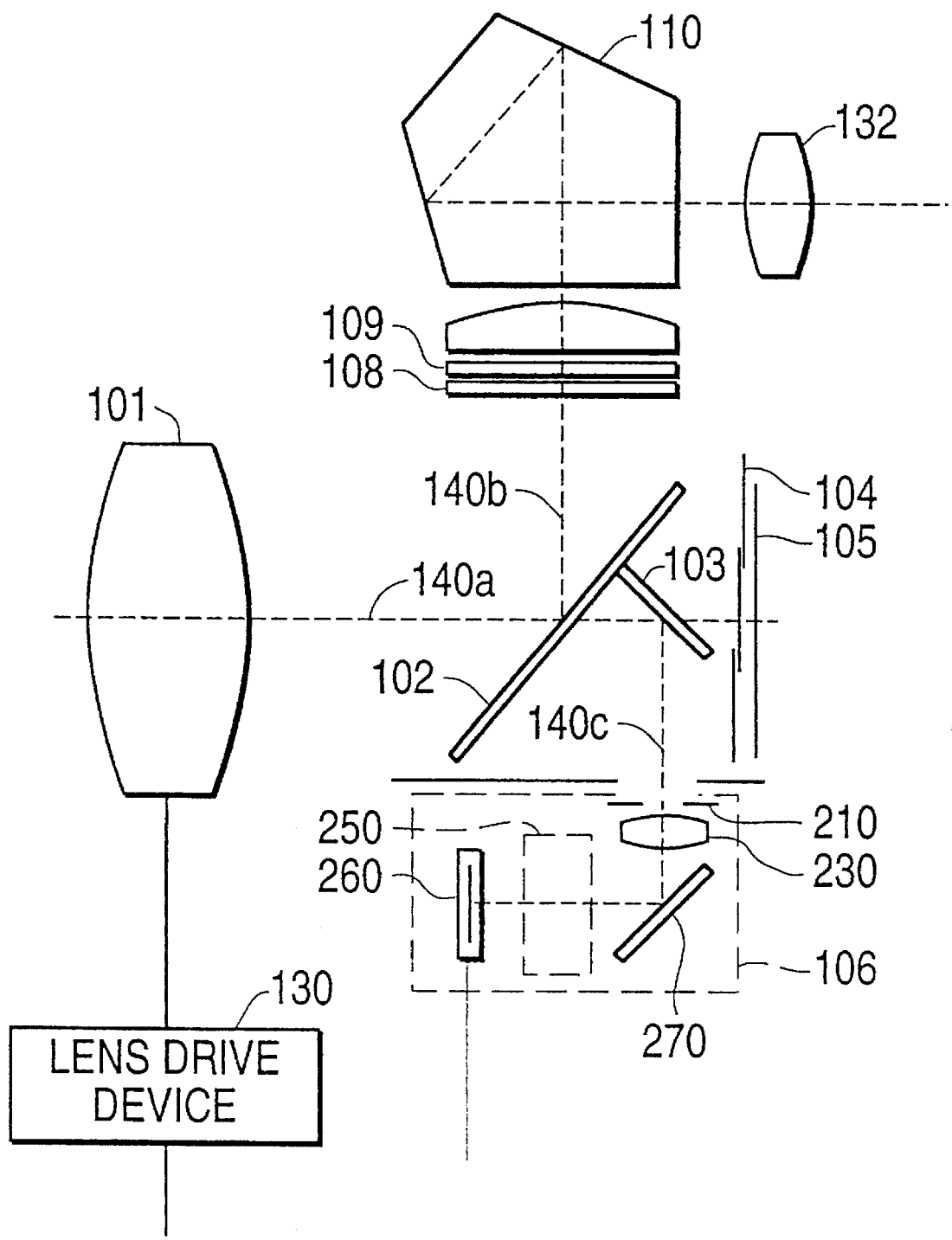
FIG. 1 is a block diagram illustrating an optical system of a camera according to an embodiment of the present invention.

Referring now to the figures, wherein like reference numerals represent similar structures or processes throughout the drawings, and more particularly to FIG. 1 which is a diagram indicating the optical system of an embodiment of a camera of the present invention. As shown in FIG. 1, light fluxes 140a pass through a conventional photographic lens 101 and are partially reflected by a conventional return mirror 102. Return mirror 102 is typically a half mirror. After being reflected by return mirror 102, a portion 140b of the light fluxes arrive at the eye (not illustrated) of a photographer by passing through a conventional transparent liquid crystal display 108, a conventional screen 109, a conventional pentaprism 110 and a conventional eyepiece 132. A portion 140c of the light fluxes passes through return mirror 102 and are reflected by a conventional submirror 103 to be received by a focal point detection block 106. Focal point detection block 106 comprises a focal detection area mask 210, a condenser lens 230, a focusing lens 250, a lens sensor 260 and a mirror 270. A conventional lens drive device 130 drives photographic lens 101. When photography is not being performed, a front surface of a film plane 105 is blocked by a conventional shutter 104. During photography, return mirror 102 retracts from the optical axis, and film plane 105 is exposed to light fluxes 140a from the subject.

Figure 2:
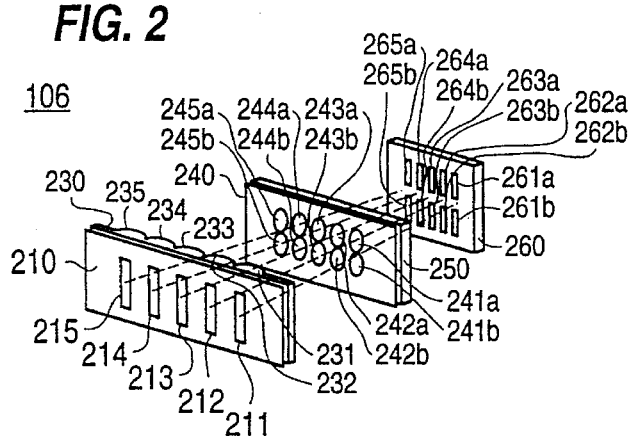
FIG. 2 is a diagram of a focal point detection block of a camera according to an embodiment of the present invention.

FIG. 2 is a diagram of focal point detection block 106, according to an embodiment of the present invention. In FIG. 2, light fluxes incident on focal point detection block 106 pass through focal point detection area mask 210, condenser lens 230, aperture mask 240, and focusing lens 250, and are focused on line sensor 260. Focal point detection area mask 210 is divided into five parts 211–215, condenser lens 230 is divided into five parts 231–235, aperture mask 240 is divided into five parts 241–245 (each part has an "a" and a "b" portion), focusing lens 250 is divided into five parts (not illustrated) and line sensor 260 is divided into five parts 261–265 (each part has an "a" and a "b" portion). Light fluxes which pass through part 211 of focal point detection area mask 210 are focused on line sensors 262a and 261b by passing through part 231 of the condenser lens, opening part 242a, 241b of the aperture mask, and corresponding parts of focus lens 250. Also, the light fluxes which pass through part 212 of focal point detection area mask 210 are focused on line sensors 262a and 262b by passing through parts 232 of the condenser lens, parts 242a, 242b of the aperture mask, and corresponding parts of focus lens 250. The other parts of focal point detection area mask 210 are similarly focused on a corresponding part of a line sensor. Thus, focal point detection block 106 functions as a light receiving unit having a plurality of portions which correspond, respectively, to a plurality of focal point detection areas.

Figure 3:
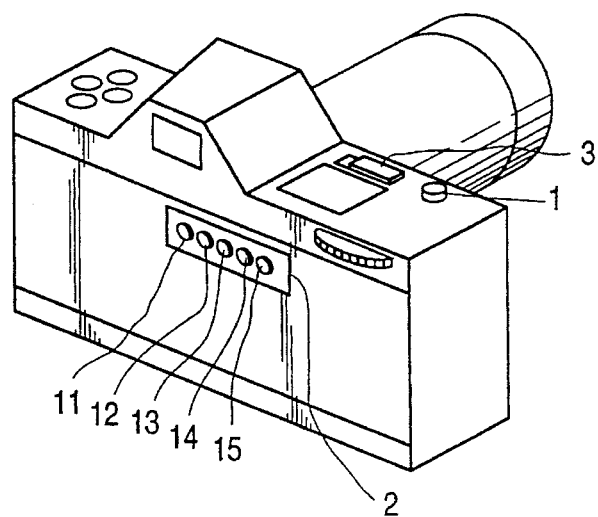
FIG. 3 is a diagram of a camera according to an embodiment of the present invention.

FIG. 3 is a diagram illustrating an external view of a camera according to an embodiment of the present invention. A conventional power source switch 3 is arranged on the camera and turns a power source (not illustrated) ON/OFF. A conventional two-stage type release member, such as release switch 1, has a half-push position and a full-push position. Light measurement and focal point detection are performed when release switch 1 is pushed by the photographer to the half-push position. Film is exposed to light from the subject when the photographer pushes release switch 1 to the full-push position. A selection unit 2 is positioned near the back cover of the camera and operates to select a respective focal point detection area. Selection unit 2 comprises selection switches 11–15.

Figure 4:
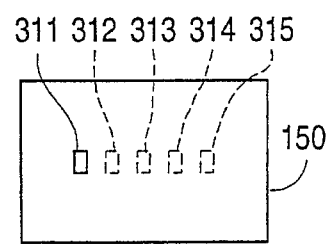
FIG. 4 is a diagram of a viewfinder of a camera according to an embodiment of the present invention.

FIG. 4 is a diagram indicating the display inside of a viewfinder 150 in a camera according to an embodiment of the present invention. Focal point detection areas 311–315 are displayed by rectangular frames. Focal point detection areas 311–315 correspond, respectively, to selection switches 11–15. The frame of a respective focal point detection area 311–315 is illuminated inside viewfinder 150 when the respective focal point detection area 311–315 is selected by pressing the corresponding selection switch 11–15. Only the frames of the various focal point detection areas 311–315 can be seen in viewfinder 150. In FIG. 4, the frame of focal point detection area 311 is illuminated. There is a variety of possible display devices for displaying the frames. Such display devices include the use of conventional liquid crystal, conventional electrochromic and conventional IRED individual illumination.

Figure 5:
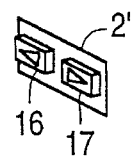
FIG. 5 is a diagram of a selection member of a camera according to an embodiment of the present invention.

FIG. 5 is a diagram indicating a selection unit 2' which has a shape that differs from selection unit 2. Selection unit 2' comprises switches 16 and 17. Switches 16 and 17 indicate desired left and right changes in the focal point detection area corresponding respectively to right and left positions in the viewfinder 150. Therefore, a selected focal point detection area is illuminated in viewfinder 150 and the photographer can change the selected focal point detection area by pressing switches 16 and 17. Each time switch 16 or switch 17 is pressed, the illuminated focal point detection area switches one time to a different focal point detection area. Thus, the focal point detection areas can be changed by the photographer by pressing switches 16 and 17.

Figure 6:
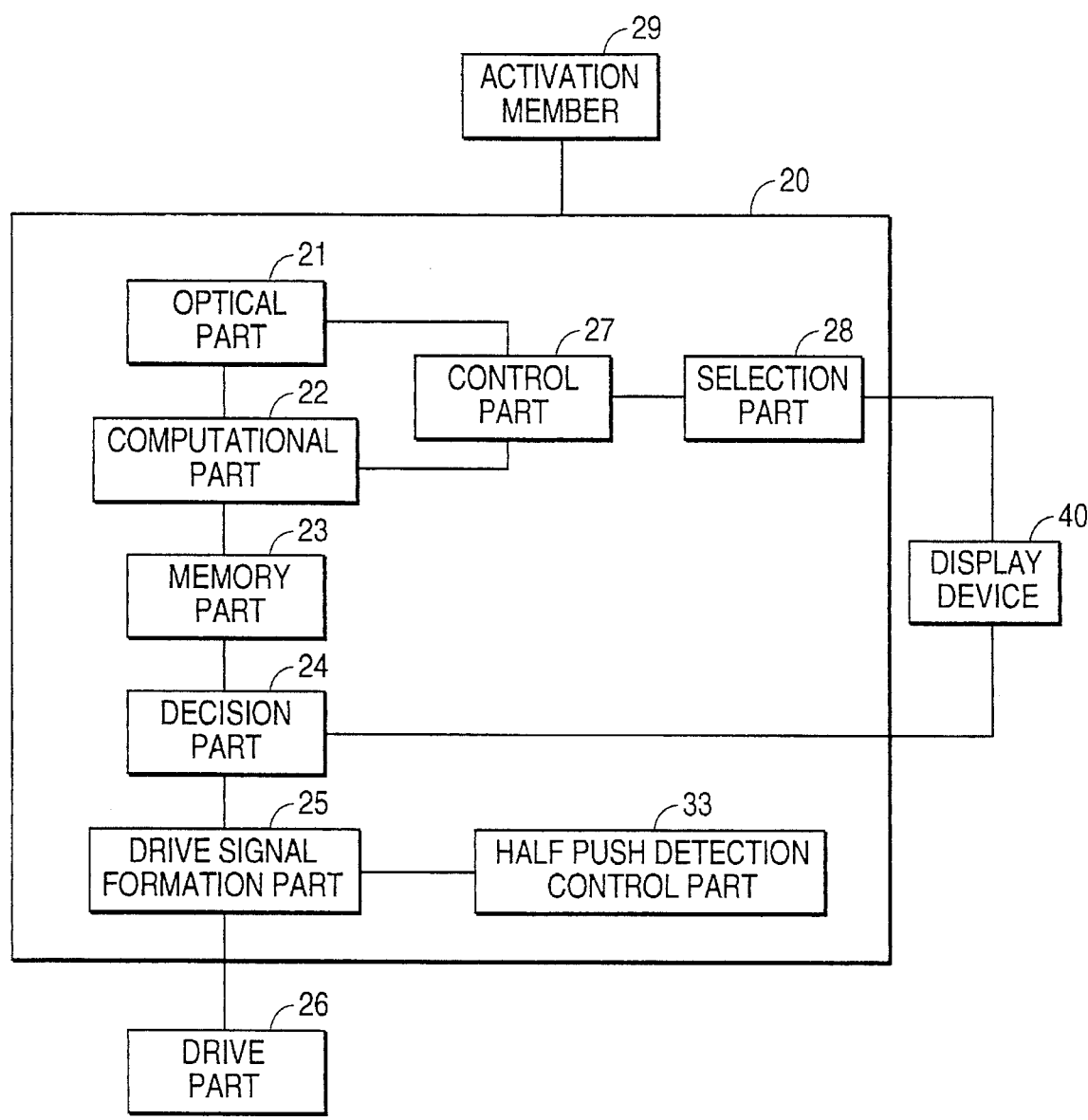
FIG. 6 is a block diagram of a camera according to an embodiment of the present invention.

FIG. 6 is a block diagram of a camera according to an embodiment of the present invention. An activation member 29 is connected to a CPU 20 and initiates a focal point detection operation by sending a signal to CPU 20 when release switch 1 is pressed by the photographer to the half-push position. A timer (not illustrated) is used with the focal point detection operation. The timer counts a specified time from release switch 1 being pushed to the half-push position and counts this specified time even if release switch 1 is released from the half-push position or such a "half-push state" is canceled. Instead of performing the focal point detection by pressing release switch 1, it is possible to activate CPU 20 to perform the focal point detection operation by turning on the camera power source switch 3 (see FIG. 3). CPU 20 comprises a conventional half-push detection control part for detecting the release switch 1 being pushed to the half-push position, based on a signal from activation member 29.

CPU 20 also comprises a conventional optical part 21, a conventional computational part 22, a conventional memory part 23, a decision part 24, a conventional drive signal formation part 25, a conventional control part 27 and a conventional selection part 28. CPU 20 functions as a focus adjustment unit to focus photographic lens 101 at an appropriate focus position. The operation of CPU 20 is based on image signals obtained from the electric charges accumulated in a conventional light receiving part (not illustrated) which is connected to optical part 21 for analyzing the signals output from the light receiving part. The light receiving part is a light receiving element such as a CCD image sensor and corresponds to focal point detection block 106 in FIG. 1. Computational part 22 is connected to optical part 21 and uses a conventional method to calculate the amount of defocus from the light received by the light receiving part. Drive signal formation part 25 uses a conventional method to formulate a drive signal for a conventional external drive part 26. Drive part 26 comprises a motor for driving photographic lens 101 in accordance with the drive signal. Half push detection control part 33 detects whether release switch 1 is pressed to the half-push position or the full-push position. Half push detection control part 33 can be designed to prevent photographic lens 101 from being driven when release switch 1 is not pressed to the half-push position or when the half-push "state" is cancelled. In this manner, photographic lens 101 is driven to a focus position when release switch 1 is pressed to the half-push position and is not driven when release switch 1 is not pressed to the half-push position.

Selection part 28 and decision part 24 are connected to a display device 40, and display device 40 displays the selected focal point detection area and the state of focus. Memory part 23 stores, in sequence, the amount of defocus calculated by computational part 22. In a camera according to the present embodiment of the present invention, memory part 23 stores the amount of defocus from the most recent time to the ten previous times. As the most recent amount of defocus is calculated, the oldest data is erased in a first-in, first-out manner. The number of stored times of the amount of defocus is, of course, not limited to ten. Decision part 24 uses the amount of defocus stored in memory part 23 and, based on the amount of defocus, determines whether or not it is necessary to drive photographic lens 101. Control part 27 is connected to selection part 28, optical part 21 and computational part 22.

Selection part 28 receives a signal from selection unit 2 (see FIG. 3). If a respective selection switch (such as selection switches 11–15 in FIG. 3) is provided for each focal point detection area, the signals of the selection switches are directly provided to selection part 28. If the selection switches are provided for moving the area to the right and left (such as selection switches 16 and 17 in FIG. 5), the relative position change is based on the selected selection switch and the past selection position, and a signal is provided to selection part 28 by determining the currently selected focal point detection area. Control part 27 controls optical part 21 and computational part 22, and repeats the focal point detection operation. Directly prior to beginning the accumulation of charges by light receiving part of optical part 21, a respective focal point detection area selected by selection part 28 is controlled to begin accumulation of charges for the respective focal point detection area. Furthermore, the initiation of the light receiving operation should be executed in a short interval. Therefore, the initiation of the light receiving operation may be executed by completing the accumulation operation of the previous time, or by completing the calculation of the amount of defocus. Alternatively, the initiation of the light receiving operation may depend on some other timing, as long as it is repeated in a short interval.

The camera experiences reduced responsiveness while waiting for the accumulation of charges to be completed if the subject is dark and the accumulation time becomes extremely long (such as 100 ms or more). Thus, a confirmation of the selected focal point detection area is conducted when a specified time has elapsed since the beginning of the previous accumulation and, if the selected focal point detection area has been changed, there may be a further attempt to begin accumulation of the light receiving part for the newly selected focal point detection area.

Moreover, control part 27 conducts the accumulation operations at all focal point detection areas. Accumulation may be performed so that the defocus calculations are executed for the selected focal point detection area. In this situation, the burden on the hardware is increased; however, the responsiveness in relation to focal point detection area switching is improved.

Drive signal formation part 25 creates drive signals based on the decision results of decision part 24. Decision part 24 executes a focus decision (discussed below), a subject jump decision (discussed below) and a subject movement decision (discussed below). As a result, drive signal formation part 25 forms the following types of drive signals:

(1) When the camera is not in focus, photographic lens 101 is driven based on the amount of defocus.

(2) When the camera is in focus, photographic lens 101 is not driven.

(3) When it is determined that a subject jump (discussed below) has been produced, photographic lens 101 is not driven by the amount of defocus corresponding to the subject jump. In this situation, photographic lens 101 may not be driven at all, or photographic lens 101 may be driven by the amount of defocus prior to when the jump was produced.

(4) When it is determined that a subject movement (discussed below) has been produced, photographic lens 101 is driven in anticipation to match the movement of the subject.

Figure 7:
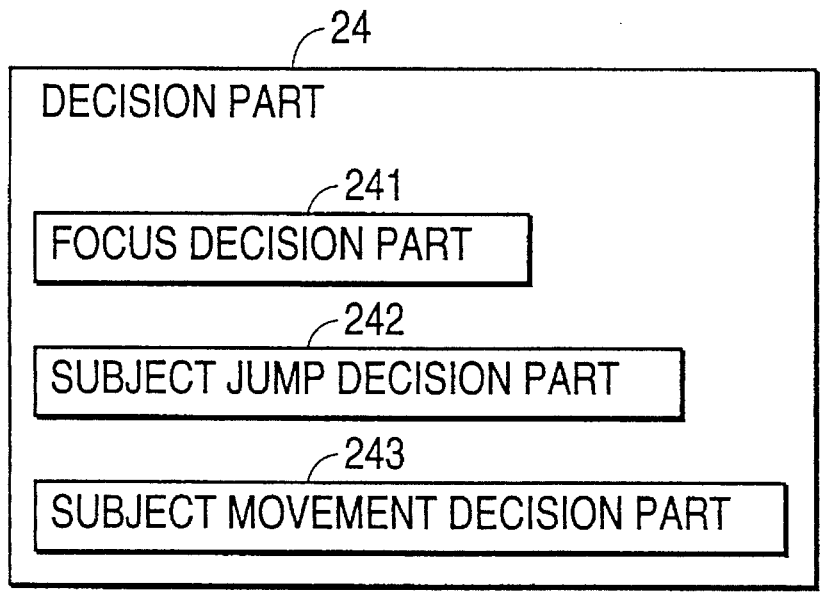
FIG. 7 is a block diagram indicating a decision part of a camera according to an embodiment of the present invention.

As illustrated in FIG. 7, decision part 24 is divided into a focus decision part 241, a subject jump decision part 242 and a subject movement decision part 243. Focus decision part 241 detects when photographic lens 101 is in focus with the subject, thereby resulting in an extremely small amount of defocus. Subject jump decision part 242 detects when the amount of defocus has quickly and significantly changed. Subject movement decision part 243 detects when there has been a small change in the amount of defocus, where the amount of change is larger than the amount of change when photographic lens 101 is in focus.

Figure 8A:
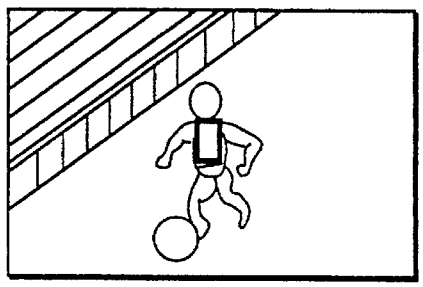
FIGS. 8(A), 8(B), 8(C) and 8(D) are diagrams illustrating a "subject jump" in a camera according to an embodiment of the present invention.
Figure 8B:
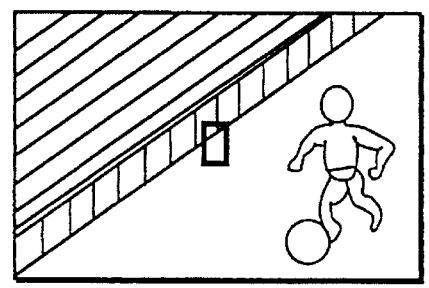
Figure 8C:
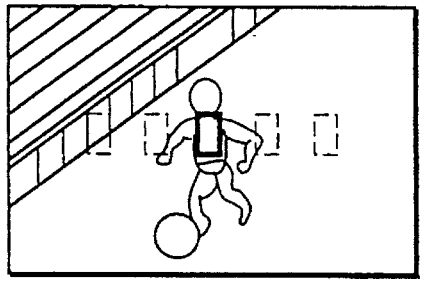
Figure 8D:
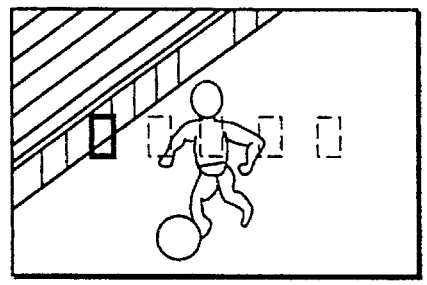

FIGS. 8(A), 8(B), 8(C) and 8(D) are diagrams illustrating a "subject jump" in a camera according to an embodiment of the present invention. As described above, a subject jump is detected by jump decision part 242. FIGS. 8(A) and 8(B) indicate an example of the subject being completely separated from one focal point detection area. This separation is caused by the photographer shaking the camera. As can be seen in FIG. 8(A), the subject is in the middle of viewfinder 150 and is centered on a respective focal point detection area. However, in FIG. 8(B), the photographer has shaken or moved the camera so that the subject is no longer in the middle of viewfinder 150 and is not centered on the focal point detection area. Thus, a subject jump occurs between FIGS. 8(A) and 8(B). FIGS. 8(C) and 8(D) indicate an example of a focal point detection area becoming completely separated from the subject. This separation is caused by the photographer operating a respective selection 11–15 switch. As can be seen in FIG. 8(C), a focal point detection area in the center of viewfinder 150 is selected. However, in FIG. 8(D), the photographer has pressed a respective selection switch 11–15 so that the left-most focal point detection area is selected. Thus, a subject jump occurs between FIGS. 8(C) and 8(D).

The following is a description of a focus decision determined by focus decision part 241 of decision part 24. Focus decision part 241 determines the focus using the following Equation (1) to determine whether or not the most recently calculated amount of defocus D(0) is within a certain range. As can be seen from Equation (1), the newest calculated amount of defocus D(0) represents the focus condition and the range is defined by a first stipulated value DF1.

$$-DF1 < \text{amount of defocus } D(0) < DF1 \qquad \text{Equation (1):}$$

In a camera according to the present embodiment of the present invention, DF1 is preferably set to 100 microns. Therefore, the camera is determined to be in focus if the amount of defocus D(0) is greater than −100 microns and less than 100 microns. Otherwise, the camera is not in focus. The amount of defocus is expressed above in units; however, the amount of defocus can also be converted into a specific ratio and compared to, for example, dimensions of feedback pulses. This use of a specific ratio is no more than a conversion of units and, therefore, the following explanation of the amount of defocus is given in units for simplicity of explanation.

The following is a description of a subject jump decision determined by subject jump decision part 242 of decision part 24. Subject jump decision part 242 determines a subject jump by determining whether or not a subject jump greater than a second predetermined amount ZJ1 has quickly been produced in a line of multiple calculated amounts of defocus. In this embodiment of the present invention, it is determined that a jump has been produced when the following Equations (2), (3), (4) and (5) are satisfied.

$$D(n) = \text{the amount of defocus at time } t(n) \qquad \text{Equation 2:}$$

$$D(n+1) = \text{the amount of defocus at a respective} \qquad \text{Equation 3:}$$

$$DJ(n) = D(n) - D(n+1) \qquad \text{Equation 4:}$$

$$|DJ(n)| > ZJ1, \text{ where } |\,| \text{ indicates the absolute value.} \qquad \text{Equation 5:}$$

Thus, there is a subject jump when $|DJ(n)| > ZJ1$. To make a more strict determination, it is possible to consider the amount of defocus in terms of the amount of lens drive between two comparable detection times. For example, with a charged couple light receiving part (such as a CCD sensor) connected to optical part 21, the points between the respective charge accumulation times are the basis for the calculation of the amount of defocus. The amounts of defocus are analyzed for these points. In this situation, it is determined that a subject jump has been generated when the amounts of defocus satisfy the following Equations (6), (7), (8), (9) and (10).

$$D(n) = \text{the amount of defocus at time } t(n) \qquad \text{Equation 6:}$$

$$D(m) = \text{the amount of defocus at time } t(m) \qquad \text{Equation 7:}$$

$$W(n, m) = \text{the amount the photographic lens is driven between detection times } t(n) \text{ and } t(m) \qquad \text{Equation 8:}$$

$$P(n, m) = D(n) + W(n, m) - D(m) \qquad \text{Equation 9:}$$

$$|P(n, m)| > \text{third predetermined value, where } |\,| \text{ indicates the absolute value.} \qquad \text{Equation 10:}$$

Thus, a subject jump has occurred when $|P(n, m)| > $ third predetermined value. Of course, the comparative combinations are not limited to the above equations. Moreover, in order to change the processing of when a subject jump has been produced during a prefocus condition, and of when a subject jump has been produced on during post focus condition, the size of the predetermined value may be changed with the positive and negative of P(n, m).

The following is a description of a subject movement decision by subject movement decision part 243 of decision part 24. Subject movement decision part 243 detects whether or not there is movement of the subject and, corresponding to a movement of the subject detected by subject movement decision part 243, a drive signal is formed by drive signal formation part 25 for driving photographic lens 101.

The time between detection times t(n) and t(m) is T(n, m). Therefore, the velocity V(n, m) of the image movement that accompanies the movement of the subject can be expressed according to the following Equation 11 by using P(n, m).

$$V(n, m) = P(n, m)/T(n, m) \qquad \text{Equation 11:}$$

If Equation (11) is used, the past image surface movement velocities are calculated in sequence as V(0,1), V(1, 2), V(2, 3), V(3, 4), etc. Normally, if the subject moves regularly, there is no sudden change in the motion velocity of the subject and the changes in the velocity of image movement should be regular and smooth. If the changes over time of the movement velocity are within the range specified for changes of movement velocity of the image plane, it can be determined that the subject is moving. For example, the image plane velocity rate R(0, 1) can be calculated according to the following Equation (12).

$$R(0, 1) = V(0, 1)/V(1, 2) \qquad \text{Equation (12):}$$

Then, it is determined whether or not the image plane velocity rate R(0, 1) is the range specified by the following Equation (13).

$0.5 < R(0, 1) < 1.5$     Equation (13):

If R(0, 1) is within the range specified by Equation (13), it can be determined that the subject is moving. If R(0, 1) is not within this range, it can be determined that the subject is jumping.

Moreover, the following method can be considered as a separate method of determining subject movement. For example, if Z(0) is taken to be the most recent among the last three subject image positions, and Z(1), Z(2) are taken to be the positions sequentially in the past, theses subject image positions may be expressed by the following Equations (14), (15) and (16).

$Z(0) = D(0) + W(0, 1) + W(1, 2)$     Equation (14)

$Z(1) = D(1) + W(1, 2)$     Equation (15)

$Z(2) = D(2)$     Equation (16)

Then, assuming the respective detection times to be t(0), t(1), and t(2), a straight line links two coordinate points among these points in relation to the three coordinates determined by (t(0), Z(0)), (t(1), Z(1)), (t(2), Z(2)), and the amount of separation by which the remaining point is separated from this straight line is calculated. If this amount of separation is less than the stipulated value, there is subject movement. If the amount of separation is greater than the predetermined value, there is a subject jump. Of course, four points of subject image plane positions Z(0), Z(1), Z(2), and Z(3) may be taken, the two dimensional curves which pass through three of these points may be derived, and the distance from the curve of the remaining point may be calculated. The shape approximating a curve of two dimensions or more may be varied, and the embodiments of the present invention are not intended to be limited to the one herein. In the above manner, decision part 24, in addition to determining the focus, determines whether or not it is necessary to drive photographic lens 101 based on at least one of the decisions about subject jump or about subject movement.

Thus, the light receiving part of optical part 21 receives light from the subject which passes through photographic lens 101 and, in accordance with a predetermined accumulation operation, accumulates charges in response to the received light. A predetermined accumulation operation is performed each time the light receiving part begins to accumulate charges.

Next, an example is provided for the sequence of combinations of several of the above described focus, subject jump, and subject movement decisions, according to an embodiment of the present invention.

Figure 9:
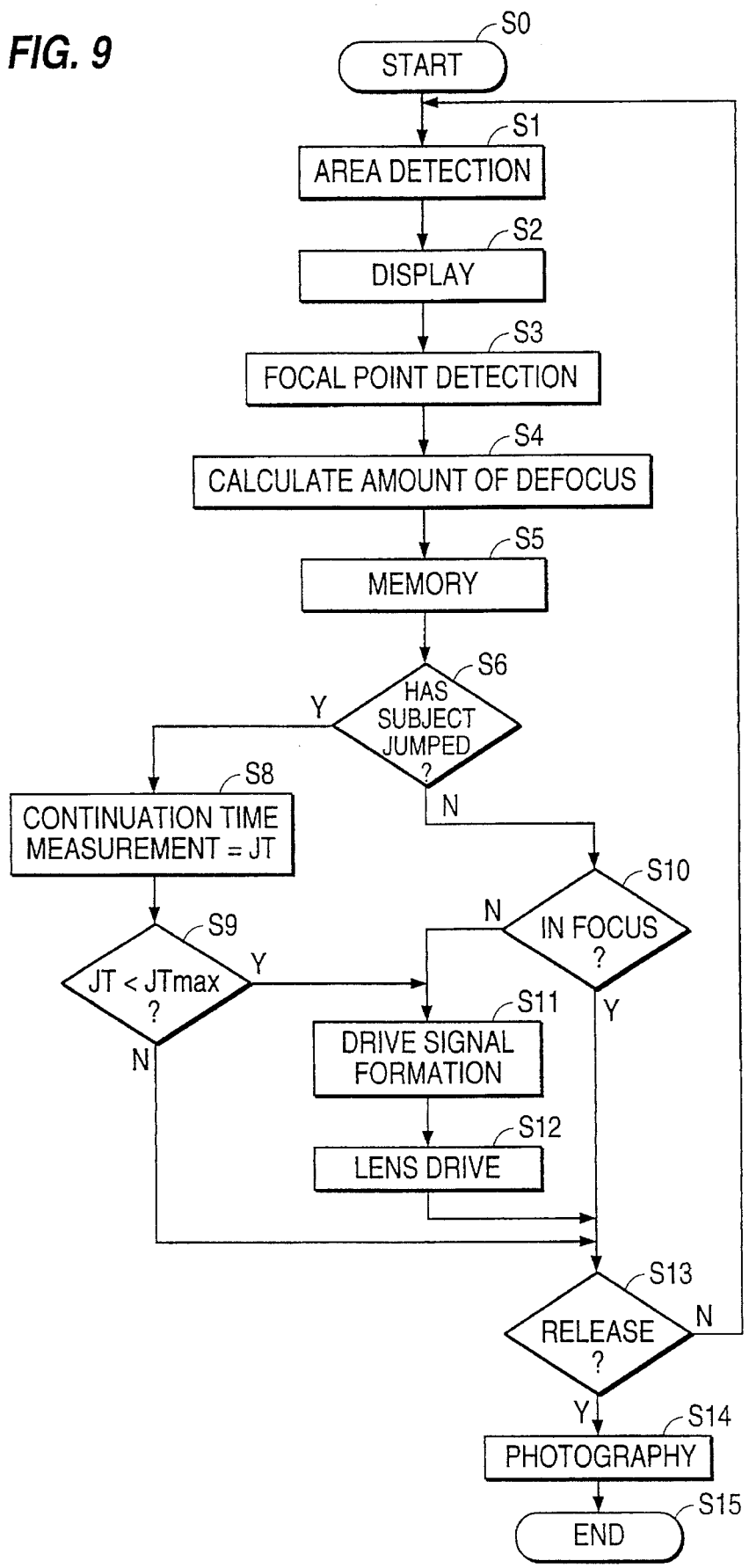
FIG. 9 is a flow chart illustrating a processing sequence of a camera according to an embodiment of the present invention.

FIG. 9 is a flow chart illustrating a processing sequence of a camera according to an embodiment of the present invention. FIG. 9 illustrates a camera which executes the focus decision and the subject jump decision, according to an embodiment of the present invention. The process beings in step S0 when release switch 3 is pushed to the half-push position in step S1, an output signal from selection part 28 is received by CPU 20 and it is detected which focus point detection area has been selected by selection unit 2. The process moves to step S2, where CPU 20 provides an output signal to display device 40 to cause the selected focal point detection area detected in step S1 to be illuminated. The process then moves to step S3, where CPU 20 provides an output signal to optical part 21 so that the light receiving part of optical part 21 begins to receive light. In step S4, computational part 22 calculates the amount of defocus D(n) based on signals obtained at step S3 and, in step S5, detection time t(n) and amount of defocus D(n) are stored in memory part 23 as indicated in Table 1, below.

In step S6, it is determined by decision part 24 whether or not there has been a subject jumps (in accordance with the previously described Equation (5)). If there has been a subject jump in step S6, the process moves to step S8. If there has not been a subject jump in step S6, the process moves to step S10. In step S8, a continuation time JT (that is, the duration of the subject jump) of the subject jump is measured based on the data of Table 1, below, stored in memory part 23, and the process moves to step S9. In step S9, the continuation time JT measured at step S8 is compared with a predetermined time JTmax and, if JT<JTmax, the subject jump is not of a long duration and the process moves to step S13. If JT is not less than JTmax, the subject jump is of a significant duration and the process moves to step S11.

In step S11, signals to drive photographic lens 101 are formed in a conventional manner by drive signal formation part 25, based on the amounts of defocus stored in Table 1, below, in memory part 23 at step S5. The process then moves to step S12. Specifically, photographic lens 101 may be driven based on the newest amount of defocus while subject jump continues, or the drive signals may be created such that the intention of the photographer is read from multiple subject jump data, future data is projected, and photographic lens 101 is driven in relation to the projected data. In step S12, the drive signals are provided to lens drive device 130 and the process moves to step S13.

In step S6, if it is determined that there was no subject jump, the process moves to step S10 where it is determined whether or not the subject is in focus (based on the determination of Equation (1)), in accordance with the amount of defocus stored in step S5. When in focus in step S10, the process moves to step S13 and, when not in focus in step S10, the process moves to step S11.

In step S13, a signal from activation member 29 indicating that status of release switch 1 is provided to CPU 20 and, if release has been executed (that is, release switch 1 is pushed to the full-push position), a photograph is taken at step S14 and the process thereafter ends in step S15. If a release has not been entered (that is, release switch 1 is not pushed to the full-push position), the process returns to step S1.

TABLE 1

| Time  | Defocus | Jump   |
|-------|---------|--------|
| t (0) | D (0)   | DJ (0) |
| t (1) | D (1)   | DJ (1) |
| t (2) | D (2)   | DJ (2) |
| t (3) | D (3)   | DJ (3) |
| t (4) | D (4)   | DJ (4) |
| t (5) | D (5)   | DJ (5) |
| t (6) | D (6)   | DJ (6) |

Figure 10A:
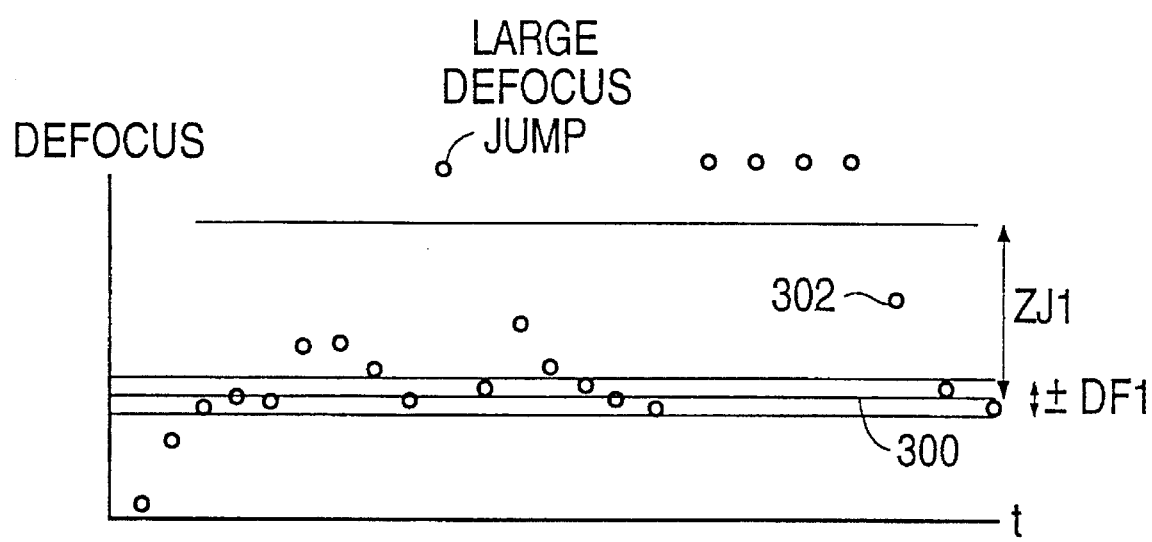
FIGS. 10(A) and 10(B) are diagrams indicating the changes in the amount of defocus and the condition of the lens drive, according to an embodiment of the present invention.
Figure 10B:
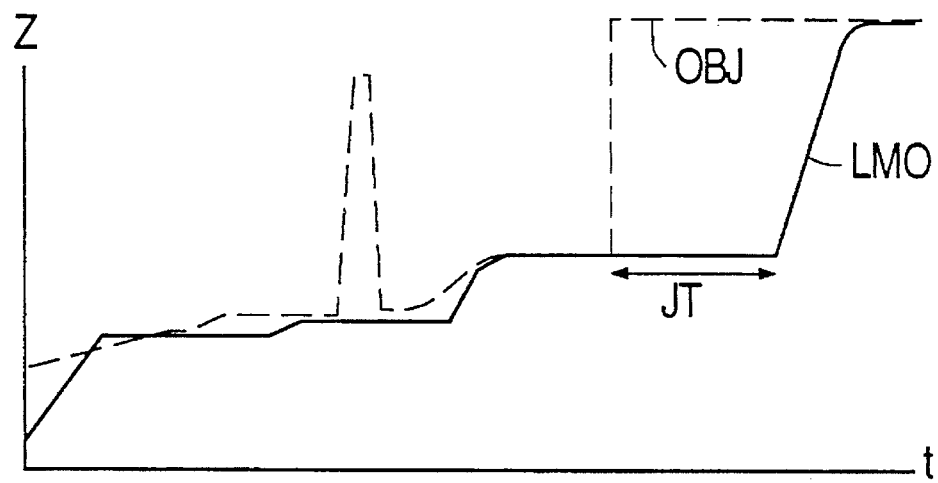

FIGS. 10(A) and 10(B) illustrate the actual lens drive in a camera operating with the processing sequence illustrated in FIG. 9, according to an embodiment of the present invention. FIG. 10(A) illustrates the temporal changes in the amount of defocus, with the horizontal axis as the time and the vertical axis as the amount of the focus. The position indicated by the line 300 is the position where the amount of defocus is zero, and the range of ±DF1 in relation to line 300 is the range in which the camera is determined to be in focus. Circular marks (for example, circular mark 302) indicate detection times corresponding to central points of charge accumulation.

FIG. 10(B) corresponds to FIG. 10(A) and indicates the temporal changes of a subject image plane OBJ and a lens position LMO. If following the processing sequence illustrated in FIG. 9 and as can be understood from FIGS. 10(A) and 10(B), if the amount of defocus is within the focus width ±DF1 (first specified amount), lens drive is terminated. However, if the amount of defocus is outside this range of ±DF1, photographic lens 101 is driven. Continuous AF servo is executed to continually move photographic lens 101 in small increments in relation to the moving subject. However, when a subject jump in defocus exceeds ZJ1 (the second specified amount), photographic lens 101 is not immediately driven in relation to the subject jump. If this subject jump continues for a significant duration (JT in FIG. 10(B)), photographic lens 101 begins to be driven so that focus is provided during the subject jump.

Subject jumps occur easily and frequently during switching of focal point detection areas. However, by controlling the camera according to the processing sequence illustrated in FIG. 9, subject jumps of a short duration are rejected and the photographic lens drive is stabilized. As a result, photographic lens 101 is not uselessly driven during these subject jumps and stable photographic lens drive performance can be obtained.

Figure 11:
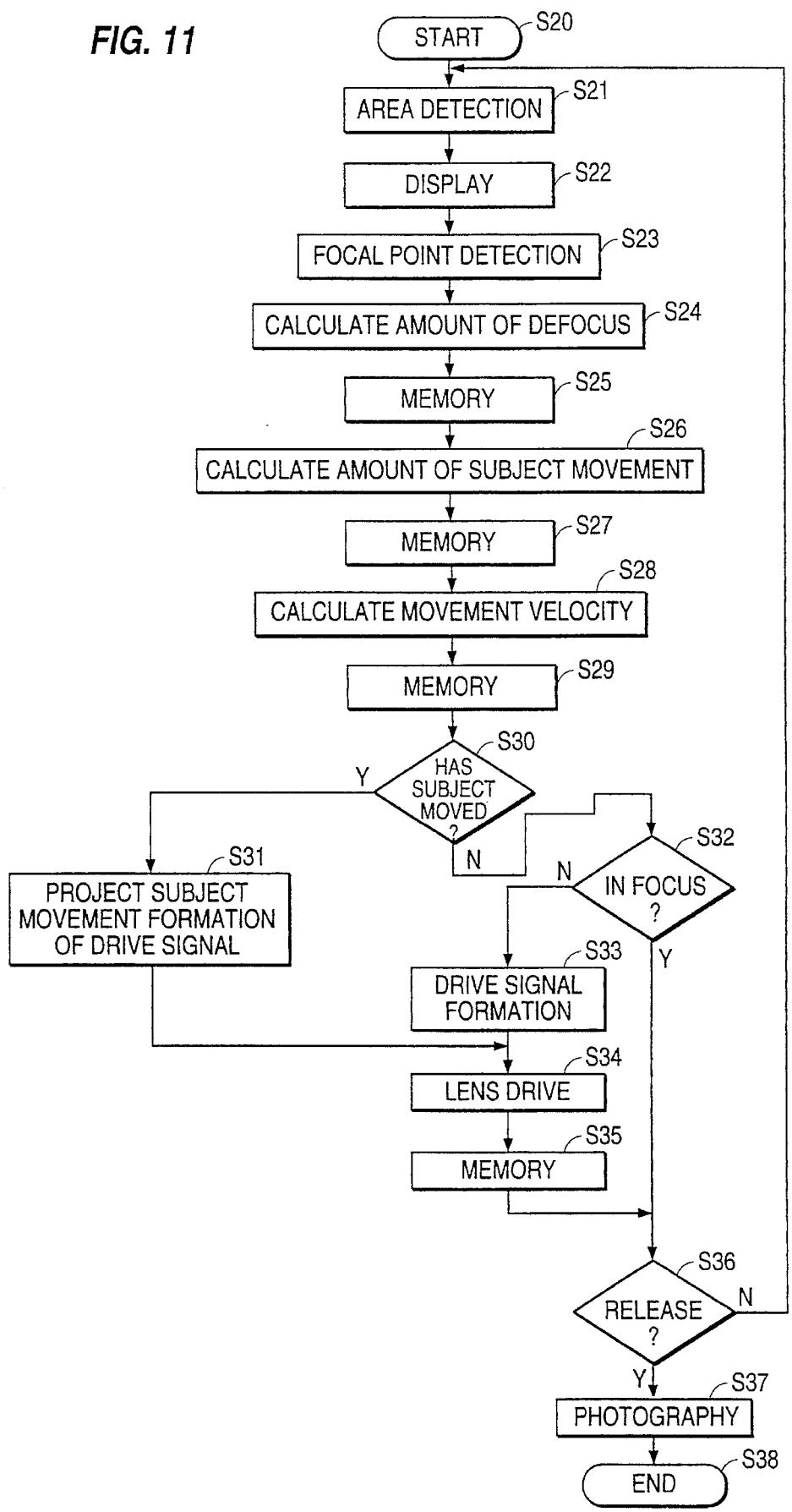
FIG. 11 is a flow chart illustrating a processing sequence of a camera according to an embodiment of the present invention.

FIG. 11 is a flow chart illustrating a processing sequence of a camera according to an embodiment of the present invention. According to the processing sequence illustrated in FIG. 11, the camera executes a focus decision and a subject movement decision.

The process starts in step S20 when release switch 1 is pushed to the half-push position (that is, at a point in time in which activation member 29 transmits a signal to CPU 20 indicating that release switch 1 has been pushed to the half-push position). In step S21, an output signal from selection part 28 is provided to CPU 20 and, from this output signal, it is detected which focal point detection area has been selected by selection unit 2.

In step S22, display device. 40 is controlled so that the selected focal point detection area is illuminated in viewfinder 150, and the process moves to step S2. In step S23, optical part 21 is controlled so that the light receiving part of optical part 21 begins to receive light (that is, accumulate charges). In step S24, computational part 22 calculates the amount of defocus D(n) from the light received by the light receiving part of optical part 21 in step S23 and, in step S25, detection time t(n) and amount of defocus D(n) are stored in memory part 23 as in Table 2, below. In step S25, the amount of lens drive W(n, n+1) is also stored in memory part 23. Then, in step S26, the amount of subject movement P(n, n+1) is calculated based on Equation (17), below, from the amount of lens drive W(n, n+1) between time t(n) and t(n+1) and the amount of defocus D(n) stored in memory part 23 in step S25. In step S27, the amount of subject movement P(n, n+1) is stored in memory part 23.

$$P(n, n+1) = D(n) + W(n, n+1) \qquad \text{Equation 17:}$$

In step S28, the subject movement velocity V(n, n+1) between times t(n) and t(n+1) are calculated from Equation (18), below, from detection time t(n) stored in step S25 and from amount of subject movement P(n, n+1) stored in step S27. In step S29, the subject movement velocity V(n, n+1) is stored in memory part 23.

$$V(n, n+1) = P(n, n+1) \cdot T(n, n+1); \qquad \text{Equation 18:}$$

where T(n, n+1)=t(n) −t(n+1)

In step S30, it is determined whether or not there is subject movement based on the data indicated in Table 2, below, that was stored in memory part 23 in step S25, step S27 and step S29 and, if there was subject movement, the process moves to step S31. If there is no subject movement in step S30, the process moves to step S32. Specifically, the following type of determination is made in step S30. Image plane speed rate R(0, 1) indicates the conditions of change for V(0,1), V(1, 2) for each cycle. Image plane speed rate R(0, 1) is expressed by R(0, 1)=V(0, 1)/V(1, 2). R(0, 1), R(1, 2), and R(2, 3), similarly represent the image plane speed rate at different points. V(0, 1), V(1, 2), and R(0, 1) will be explained as a representative example.

Figure 12A:
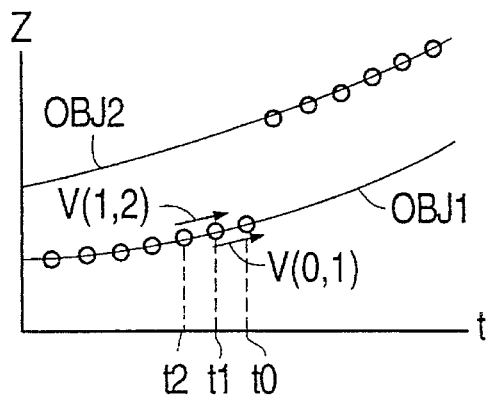
FIGS. 12(A), 12(B), 12(C), 12(D) and 12(E) are diagrams indicating changes of the subject and the condition of the lens drive, according to an embodiment of the present invention.
Figure 12B:
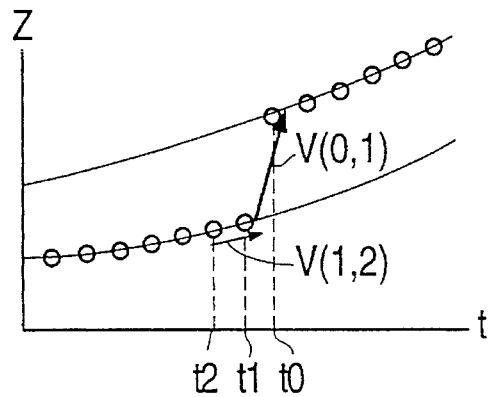
Figure 12C:
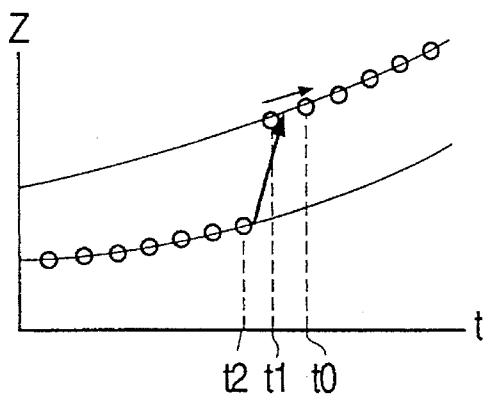
Figure 12D:
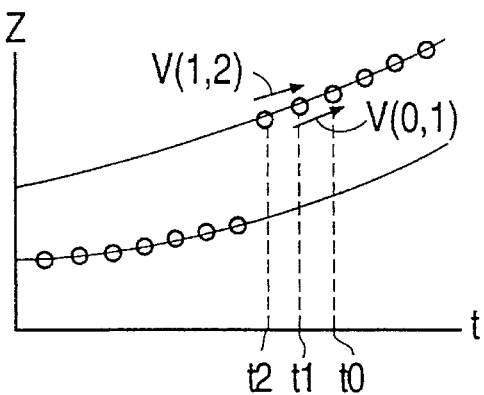

As indicated by FIGS. 12(A) and 12(D), discussed in greater detail below, if the subject continues to move with comparative regularity, the value of the rate R(0, 1) is approximately equal to 1. Consequently, as with previously described Equation (13), the specified range is set at 0.5<R(0, 1)<1.5. If R(0, 1) does not fall within this specified range, it is determined that the subject has jumped. FIGS. 12(B) and 12(C) indicate situations where R(0, 1) does not fall within the specified range. If R(0, 1) falls within the specified range, there is no subject jump and it is determined whether the subject is continuing to move or is standing still.

It cannot be determined solely from Equation (13) whether or not the subject is continuously moving or standing still. Therefore, the following Equation 19 is used.

$$|V(0,1)| > Vth \qquad \text{Equation 19:}$$

If Equation 19 is not satisfied (that is, if. |V(0, 1)| is not greater than Vth), then it is determined that the subject is still and, if Equation (19) is satisfied (that is, if |V(0, 1)|>Vth), then it is determined that the subject is moving. Vth is a specified number greater than zero.

The above-described decision is a decision about subject movement and the above equations are sufficient for an appropriate determination in step S30. However, it is preferable to calculate a specified rate or multiple rates within a specified time based on the information stored in Table 2, below. The multiple rates are represented by:

$$R(0, 1), R(1, 2), R(2, 3), R(3, 4), \text{etc.}$$

Whether there is subject movement can be determined in step S31 when a fixed number rate R(i, j) among the multiple rates satisfies Equation (13). Once a fixed number rate R(i, j) satisfies Equation (13), at least one corresponding V(i, j) satisfies Equation (19'), below.

$$|V(i, j)| > Vth \ldots (19') \qquad \text{Equation (19):}$$

Also, by broadening the time band of the data which is used in the determination of subject movement, it is possible to treat the following two situations, (A) and (B), as providing subject movement:

(A) There is subject movement, and there is no subject jump.

(B) A subject jump was temporarily produced, but as a whole, there has been a subject movement.

Referring again to FIG. 11, in step S31, a conventional method is used to form a drive signal for driving photographic lens 101 by anticipating subject movement. The special characteristics of step S31 is in the handling of the situation (B), above. In step S31 with situation (B), the lens drive operation is not sidetracked, or interrupted, due to the influence of a subject jump.

When it is determined at step S30 that there is no subject movement, the process moves to step S32 and it is determined whether or not photographic lens 101 is in focus (using previously described Equation (1) based on the amount of defocus stored in step S25). If in focus in step S32, the process moves to step S36. If not in focus in step S32, the process moves to step S33. In step S33, a drive signal to drive photographic lens 101 is formed, based on the amount of defocus stored in memory part 23 in step S24 (see Table 2, below), and the process moves to step S34. Specifically, photographic lens 101 may be driven while a subject jump continues, based on the newest amount of the focus, and the drive signal may be created such that future data is projected by reading the intention of the photographer from multiple subject jump data. Photographic lens 101 is driven in relation to the projected data.

In step S34, the drive signal is provided to lens drive device 130, and the process then moves to step S35. In step S35, the drive signal formed in step S31 or step S33 is stored in memory part 23 as a lens drive amount. In step S36, a signal from release switch 1 is provided to CPU 20 and it is determined whether the photographer has pushed release switch 1 to the full-push position to indicate a release operation. If release switch 1 was pushed to the full-push position, photography is executed in step S37 and the process ends in step S38. If release switch 1 was not pushed to the full-push position in step S36, there has been no release and the process returns to step S21.

TABLE 2

| Time | Defocus | Lens Drive | Subject Movement | Subject Movement |
|---|---|---|---|---|
| t (0) | D (0) | W (0,1) | P (0,1) | V (0,1) |
| t (1) | D (1) | W (1,2) | P (1,2) | V (1,2) |
| t (2) | D (2) | W (2,3) | P (2,3) | V (2,3) |
| t (3) | D (3) | W (3,4) | P (3,4) | V (3,4) |
| t (4) | D (4) | W (4,5) | P (4,5) | V (4,5) |
| t (5) | D (5) | W (5,6) | P (5,6) | V (5,6) |
| t (6) | D (6) | W (6,7) | P (6,7) | V (6,7) |

FIGS. 12(A), 12(B), 12(C), 12(D) and 12(E) indicate the temporal changes with the subject image plane position or the lens position as the vertical axis, and the coordinate axis taken to be the same as FIG. 10(B), for a camera which follows the processing sequence of FIG. 11 according to an embodiment of the present invention. Round marks are points during charge accumulation. OBJ1 indicates the time changes of the subject image plane of a first subject facing the photographer and moving. OBJ2 indicates the temporal changes of the subject image plane of a second subject which is facing the photographer and moving. The round mark moving from OBJ1 to OBJ2 during this process indicates that the focal point detection area has not been switched in this point in time and focal point detection has begun on a subject at a different distance.

Figure 12E:
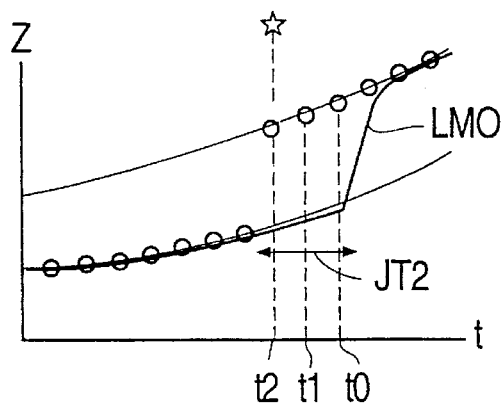

As indicated by FIGS. 12(A) and 12(D), the image plane speed rate R(0, 1) is within the specified range (for example 0.5<R(0, 1)<1.5). However, in FIGS. 12(B) and 12(C), R(0, 1) is not within the specified range. Therefore, as indicated by FIG. 12(E), the loci of lens movement is controlled by the functions of decision part 24 and drive signal formation part 25 and a large change in the lens drive does not occur until time t0. It is at this time t0 that R(0, 1) is back within the specified range, as illustrated in FIG. 12(D). Such control of the loci of lens movement is illustrated as LMO in FIG. 12(E). In this manner, as illustrated in FIG. 12(E), the locus of photographic lens 101 is controlled even if changing from moving subject OBJ1 to a separate moving subject OBJ2 accompanying a switch of focal point detection areas. Thus, a continuing AF servo with a smooth response is executed even in the middle of pursuit.

During the middle of pursuit, it is easy for errors in operations to be produced in which the projection goes astray due to slight external disruptions when projecting future data from past data. However, with the processing sequence illustrated in FIG. 11 in a camera according to an embodiment of the present invention, data from subject jumps caused by switching of focal point detection areas is rejected and a new pursuit is entered when sufficient information is organized. Also, a camera according to the above embodiments of the present invention provides an accurate and smooth projected drive since there is not any wasted or unnecessary drive of the photographic lens.

Figure 13:
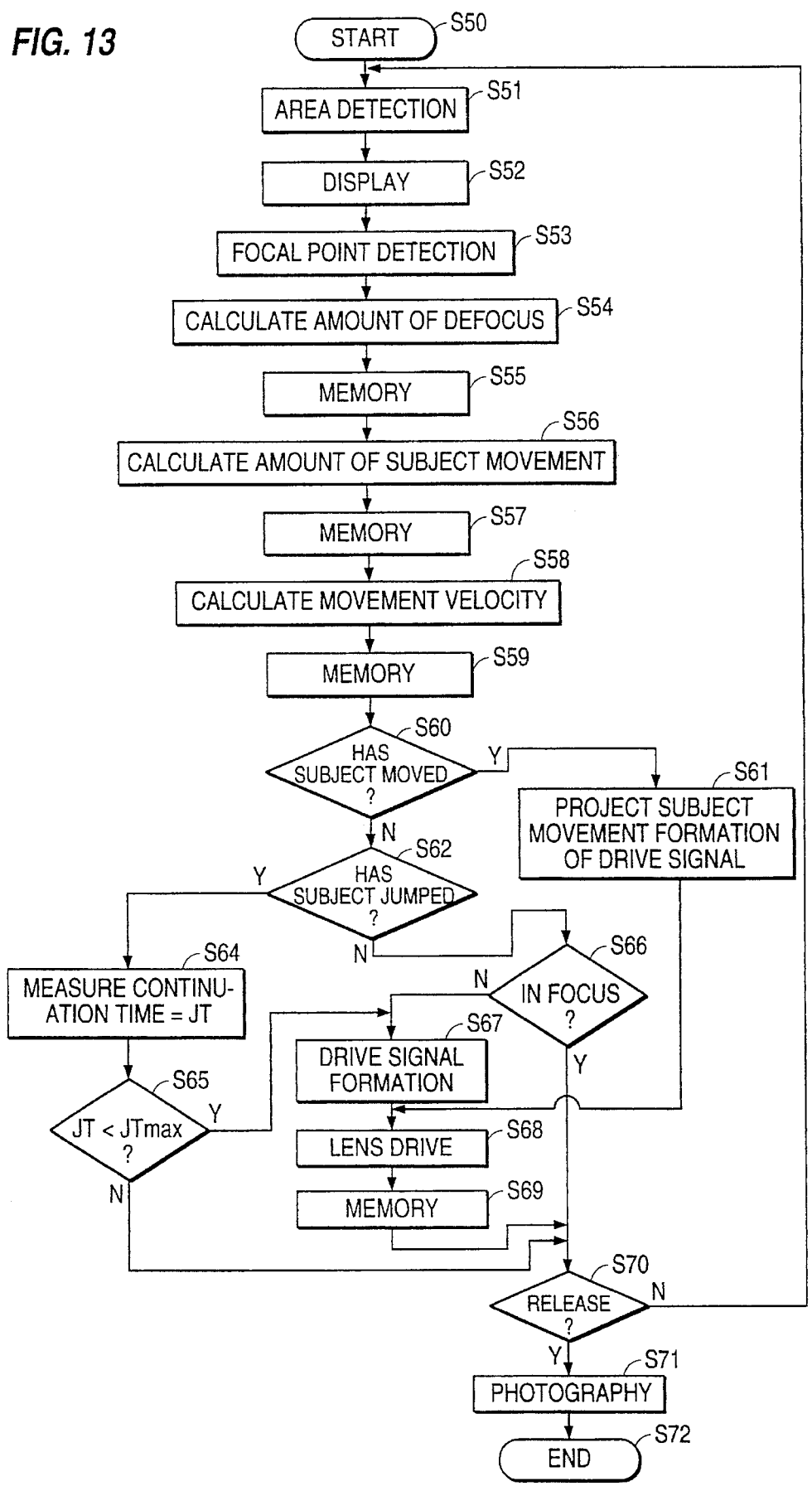
FIG. 13 is a flow chart illustrating a processing sequence of a camera according to an embodiment of the present invention.

FIG. 13 is a flow chart illustrating a processing sequence of a camera according to an embodiment of the present invention. As illustrated by the processing sequence of FIG. 13, the camera executes focus decisions, subject jump decisions and subject movement decisions. In FIG. 13, the process starts when release switch 1 is pushed to the half-push position (that is, when activation member 29 transmits a signal to CPU 20 indicating that release switch 1 has been pushed to the half-push position). In step S51, selection part 28 provides a signal to CPU 20 and, from this signal, it is detected which focal point detection area has been selected by selection unit 2.

In step S52, display device 40 is controlled so that the selected focal point receiving part of optical part 21 begins to receive light. In step S54, computational part 22 calculates the amount of defocus D(n) from light received in step S53 and, in step S55, detection time t(n) and amount of defocus D(n) are stored in memory part 23 (see Table 2). In step S56, the amount of subject movement P(n, n+1) is calculated based on Equation (17), below, from the amount of lens drive W(n, n+1) between time t(n) and t(n+1) and from the amount of defocus D(n). In step S57, the amount of subject movement P(n, n+1) is stored in memory part 23. Equation (17):

$$P(n, n+1) = D(n) + W(n, n+1) - D(n+1) \qquad \text{Equation (17);}$$

In step S58, the subject movement velocity V(n, n+1) between times t(n) and t(n+1) is calculated by Equation (18), below, from detection time t(n) stored in step S55 and from amount of subject movement P(n, n+1) stored in step S57. In step S59, the subject movement velocity V(n, n+1) is stored in memory part 23.

$$V(n, n+1) = P(n, n+1)/T(n, n+1); \qquad \text{Equation (18):}$$

where T (n, n+1) = t (n) − t (n+1).

In step S60, it is determined whether or not there is subject movement based on the data stored in memory part 23 in step S55, step S57 and step S59. If there is subject movement in step S60, the process moves to step S61. If there is no subject movement in step S60, the process moves to step S62. In step S61, a conventional method is performed to form a drive signal to anticipate subject movement, and the process moves to step S68. When a signal from decision part 24 is provided to CPU 20 in step S62, it is determined whether or not there has been subject jump. This determination is based on the previously described Equation (5). If there has been a subject jump in step S62, the process moves to step S64. If there has not been a subject jump in step S62, the process moves to step S66. In step S64, a continuation time JT of the subject jump is measured based on the data stored in memory part 23, and the process then moves to step S65. In step S65, continuation time JT is compared with a predetermined time JTmax and, if JT<JTmax, the process moves to step S67. If JT is not less than JTmax, the process moves to step S70.

If it is determined in step S62 that there is no subject jump, the process moves to step S66 where it is determined whether or not the subject is in focus by using previously described Equation (1) based on the amount of defocus stored in step S55. If in focus in step S66, the process moves to step S70. If not in focus in step S66, the process moves to step S67. In step S67, a drive signal to drive photographic lens 101 is formed, based on the data for the amount of defocus stored in memory parts 23 in step S55, and the process then moves to step S68. Specifically, photographic lens 101 may be driven based on the newest amount of defocus while subject jump continues, or the drive signals may be created such that the intention of the photographer is read from multiple subject jump data, future data is projected, and photographic lens 101 is driven in relation to the projected data.

In step S68, the drive signal is provided to lens drive device 130, and the process then moves to step S69. In step S69, the drive signal formed in step S61 or step S67 is stored in memory part 23 as a lens drive amount. In step S70, an output signal from activation member 20 is provided to CPU. 20 to determine if a release by release switch I has occurred (that is, if the photographer has pushed release switch 1 to the full-push position). If release has occurred in step S70, photography is executed in step S71 by a conventional method of releasing shutter 104, and the process then ends in step S72. If there has been no release in step S70, the process returns to step S51.

In a camera according to the above embodiments of the present invention, an abnormal fluctuation in the amount of defocus is detected and the photographic lens is controlled so that the abnormal fluctuation does not adversely affect the photographic lens drive. As a result, a smooth, continuing AF servo is achieved.

In a camera according to the above embodiments of the present invention, the photographic lens is automatically driven in response to detected amounts of defocus. However, there are situations in which a photographer may want to intentionally stop the photographic lens from being automatically driven. Therefore, it is preferable that the camera is provided with a switch or mechanism to allow the photographer to forcibly prevent the photographic lens from being automatically driven. For example, such a switch or mechanism could "cancel" the effect of the release switch 1 being pushed to the half-push position. The camera can be configured so that, when release switch 1 is pushed to the half-push position for a second time, a continuous operation is performed during a specific timed period in which focal point detection is performed. Then, when the specific timed period elapses from the pushing of the release button, an automatic photographic lens drive can be performed.

Generally, in a camera according to the above embodiments of the present invention, the focus condition of the subject is determined and the photographic lens is driven, without dependence on a switching of the focal point detection area.

In a camera according to the above embodiments of the present invention, control of the photographic lens drive is independent of the switching of focal point detection areas. Photographic lens drive is executed in correspondence to a time series line of focal point detection results, thereby achieving a smooth multiple focal point detection area continuous AF servo.

In a camera according to the above embodiments of the present invention, the photographic lens is not necessarily driven by switching from a first focal point detection area to a second focal point detection area where the subject distances are nearly the same for the first focal point detection area and the second focal point detection area. The photographic lens is only driven when necessary. Therefore, continuous focus can be achieved without unnecessarily driving the photographic lens.

In a camera according to the above embodiments of the present invention, if the subject distance changes between the first focal point detection area and the second focal point detection area, the difference in the subject distances is analyzed. If a large jump (that is "subject jump") in the subject distance is produced by switching from the first focal point detection area to the second focal point detection area, or if the subject distances have changed irregularly when passing through respective focal point detection areas during switching from the first focal point detection area to the second focal point detection area, the camera discriminates among these changes to determine whether or not it is necessary to drive the photographic lens. In this manner, a continuous AF servo can be obtained in which smooth focal point adjustment operations are performed even if fluctuations in the focal point detection results are caused by switching from the first focal-point detection area to the second focal point detection area.

Moreover, in a camera according to the above embodiments of the present invention, the determination of whether to drive the photographic lens is made independently of any switching of focal point detection areas. Thus, the camera is effective in relation to subject jumps that can be produced in the same focal point detection area.

Although a few preferred embodiments of the invention have been shown and described, it will be appreciated by those skilled in the art that changes may be made in these embodiments, without departing from the principles and the spirit of the invention, the scope of which is defined in the claims and their equivalents.

What is claimed is:

1. A camera having first and second focal point detection areas which are individually selectable to focus a subject in the selected focal point detection area, the first focal point detection area initially being selected and, thereafter, the second focal point detection area being selected, the camera comprising:

a photographic lens; and a focus adjustment unit which calculates a defocus amount corresponding to the first focal point detection area when the first focal point detection area is selected, drives the photographic lens in accordance with the defocus amount corresponding to the first focal point detection area to focus the subject in the first focal point detection area when the first focal point detection area is selected, calculates a defocus amount corresponding to the second focal point detection area when the second focal point detection area is selected, and controls the drive of the photographic lens to focus the subject in the second focal point detection area when the second focal point detection area is selected, based on the defocus amount calculated for the first focal point detection area and the defocus amount calculated for the second focal point detection area.

2. A camera as in claim 1, wherein the focus adjustment unit calculates a sequence of defocus amounts corresponding, respectively, to a sequence of points in time, wherein the sequence of defocus amounts includes the respective defocus amounts calculated for the first and second focal point detection areas.

3. A camera as in claim 1, further comprising a light receiving unit having first and second portions which correspond, respectively, to the first and second focal point detection areas and the defocus amounts are calculated by the focus adjustment unit in relation to the amount of light received by the light receiving unit.

4. A camera as in claim 1, further comprising a selection unit which allows a photographer to individually select among the first and second focal point detection areas.

5. A camera as in claim 2, wherein the focus adjustment unit monitors the sequence of defocus amounts to adjust the photographic lens whenever the photographic lens is not in focus, thereby maintaining focus by continuously driving the photographic lens.

6. A camera as in claim 1, further comprising an activation member which is controlled by a photographer to begin calculation of the defocus amounts by the focus adjustment unit.

7. A camera as in claim 1, wherein the focus adjustment unit does not drive the photographic lens to focus the subject in the second focal point detection area when the defocus amount corresponding to the first focal point detection area and the defocus amount corresponding to the second focal point detection area are separated by more than a predetermined value.

8. A camera as in claim 1, wherein:
 the focus adjustment unit drives the photographic lens to focus the subject in the second focal point detection area when the difference between the defocus amount corresponding to the first focal point detection area and the defocus amount corresponding to the second focal point detection area is within a predetermined range, and
 the focus adjustment unit does not drive the photographic lens to focus the subject in the second focal point detection area when the difference between the defocus amount corresponding to the first focal point detection area and the defocus amount corresponding to the second focal point detection area is not within the predetermined range.

9. A camera as in claim 1, further comprising:
 a release member having a first state and a second state which are selectable by a photographer, and
 a release member state detecting device which allows the photographic lens to be driven when the release member is in the first state and prevents the photographic lens from being driven when the release member is in the second state.

10. A camera as in claim 2, further comprising:
 a light receiving unit which receives light from the subject which passes through the photographic lens and, in accordance with a predetermined accumulation operation, accumulates charges in response to the received light, the light receiving unit having first and second portions which correspond, respectively, to the first and second focal point detection areas, the focus adjustment unit calculating defocus amounts for a respective focal point detection area based on charges accumulated by the corresponding portion of the light receiving unit, and
 a control unit which causes the light receiving unit to execute the predetermined accumulation operation in each point in time of the sequence of points in time.

11. A camera as in claim 1, wherein the focus adjustment unit determines that a subject jump has occurred when the absolute value of the difference between the defocus amount corresponding to the first focal point detection area and the defocus amount corresponding to the second focal point detection area is greater than a predetermined value and, when a subject jump has occurred, the focus adjustment unit:
 does not drive the photographic lens to focus the subject in the second focal point detection area when the subject jump lasts for less than a predetermined time period, and
 drives the photographic lens to focus the subject in the second focal point detection area when the subject jump lasts for more than the predetermined time period.

12. A camera having multiple focal point detection areas which are individually selectable to focus a subject in a respective, selected focal point detection area, the camera comprising:
 a photographic lens; and
 a focus adjustment unit which drives the photographic lens to focus the subject in a selected focal point detection area by
 calculating a sequence of defocus amounts corresponding, respectively, to sequential points in time, each defocus amount corresponding to a respective focal point detection area selected at the corresponding point in time, and
 driving the photographic lens to focus the subject based on the sequence of defocus amounts, the photographic lens continuing to be driven based on the sequence of defocus amounts when the selected focal point detection area is switched to a different focal point detection area during the sequential points in time, without considering whether the selected focal point detection area has been switched to a different focal point detection area during the sequential points in time, without considering whether the selected focal point detection area has been switched to a different focal point detection area.

13. A camera as in claim 12, wherein a first focal point detection area of the multiple focal point detection areas is initially selected and a second focal point detection area of the multiple focal point detection areas is sequentially selected after the first focal point detection area is selected, the sequence of defocus amounts includes a first defocus amount corresponding to the first focal point detection area when the first focal point detection area was selected, and a second defocus amount corresponding to the second focal point detection area when the second focal point detection area was selected.

14. A camera as in claim 12, wherein the focus adjustment unit monitors the sequence of defocus amounts to adjust the photographic lens whenever the photographic lens is not in focus, thereby maintaining focus by continuously driving the photographic lens.

15. A camera as in claim 12, further comprising an activation member which is controlled by a photographer to begin calculation of the defocus amounts by the focus adjustment unit.

16. A camera as in claim 13, wherein the focus adjustment unit does not drive the photographic lens to focus the subject in the second focal point detection area when the defocus amount corresponding to the first focal point detection area and the defocus amount corresponding to the second focal point detection area are separated by more than a predetermined value.

17. A camera as in claim 13, wherein:
 the focus adjustment unit drives the photographic lens to focus the subject in the second focal point detection area when the difference between the defocus amount corresponding to the first focal point detection area and the defocus amount corresponding to the second focal point detection area is within a predetermined range, and the focus adjustment unit does not drive the photographic lens to focus the subject in the second focal point detection area when the difference between the defocus amount corresponding to the first focal point detection area and the defocus amount corresponding to the second focal point detection area are not within the predetermined range.

18. A camera as in claim 12, further comprising:

a release member having a first state and a second state which are selectable by a photographer, and a release member state detecting device which allows the photographic lens to be driven when the release member is in the first state and prevents the photographic lens from being driven when the release member is in the second state.

19. A camera as in claim 13, wherein the focus adjustment unit determines that a subject jump has occurred when the absolute value of the difference between the defocus amount corresponding to the first focal point detection area and the defocus amount corresponding to the second focal point detection area is greater than a predetermined value and, when a subject jump has occurred, the focus adjustment unit:

does not drive the photographic lens to focus the subject in the second focal point detection area when the subject jump lasts for less than a predetermined time period, and drives the photographic lens to focus the subject in the second focal point detection area when the subject jump lasts for more than the predetermined time period.

20. A camera as in claim 17, wherein the focus adjustment unit determines that a subject jump has occurred when the absolute value of the difference between the defocus amount corresponding to the first focal point detection area and the defocus amount corresponding to the second focal point detection area is greater than a predetermined value and, when a subject jump has occurred, the focus adjustment unit:

does not drive the photographic lens to focus the subject in the second focal point detection area when the subject jump lasts for less than a predetermined time period, and drives the photographic lens to focus the subject in the second focal point detection area when the subject jump lasts for more than the predetermined time period.

21. A camera having multiple focal point detection areas which are individually selectable to focus a subject in a respective, selected focal point detection area, the camera comprising:

a photographic lens; and a focus adjustment unit which drives the photographic lens to focus the subject in a selected focal point detection area by calculating a sequence of defocus amounts corresponding, respectively, to sequential points in time, each defocus amount corresponding to a respective focal point detection area selected at the corresponding point in time, and driving the photographic lens to focus the subject based on the sequence of defocus amounts, irrespective of whether the selected focal point detection area has been switched to a different focal point detection area during the sequential points in time, wherein a first focal point detection area of the multiple focal point detection areas is initially selected and a second focal point detection area of the multiple focal point detection areas is sequentially selected after the first focal point detection area is selected, the sequence of defocus amounts includes a first defocus amount corresponding to the first focal point detection area when the first focal point detection area was selected, and a second defocus amount corresponding to the second focal point detection area when the second focal point detection area was selected, and the focus adjustment unit does not drive the photographic lens to focus the subject in the second focal point detection area when the defocus amount corresponding to the first focal point detection area and the defocus amount corresponding to the second focal point detection area are separated by more than a predetermined value.

22. A camera having multiple focal point detection areas which are individually selectable to focus a subject in a respective, selected focal point detection area, the camera comprising:

a photographic lens; and a focus adjustment unit which drives the photographic lens to focus the subject in a selected focal point detection area by calculating a sequence of defocus amounts corresponding, respectively, to sequential points in time, each defocus amount corresponding to a respective focal point detection area selected at the corresponding point in time, and driving the photographic lens to focus the subject based on the sequence of defocus amounts, irrespective of whether the selected focal point detection area has been switched to a different focal point detection area during the sequential points in time, wherein a first focal point detection area of the multiple focal point detection areas is initially selected and a second focal point detection area of the multiple focal point detection areas is sequentially selected after the first focal point detection area is selected, the sequence of defocus amounts includes a first defocus amount corresponding to the first focal point detection area when the first focal point detection area was selected, and a second defocus amount corresponding to the second focal point detection area when the second focal point detection area was selected, the focus adjustment unit drives the photographic lens to focus the subject in the second focal point detection area when the difference between the defocus amount corresponding to the first focal point detection area and the defocus amount corresponding to the second focal point detection area is within a predetermined range, and the focus adjustment unit does not drive the photographic lens to focus the subject in the second focal point detection area when the difference between the defocus amount corresponding to the first focal point detection area and the defocus amount corresponding to the second focal point detection area are not within the predetermined range.

23. A camera as in claim 22, wherein the focus adjustment unit determines that a subject jump has occurred when the absolute value of the difference between the defocus amount corresponding to the first focal point detection area and the defocus amount corresponding to the second focal point detection area is greater than a predetermined value and, when a subject jump has occurred, the focus adjustment unit:

does not drive the photographic lens to focus the subject in the second focal point detection area when the subject jump lasts for less than a predetermined time period, and drives the photographic lens to focus the subject in the second focal point detection area when the subject jump lasts for more than the predetermined time period.

24. A camera having multiple focal point detection areas which are individually selectable to focus a subject in a respective, selected focal point detection area, the camera comprising:

a photographic lens; and a focus adjustment unit which drives the photographic lens to focus the subject in a selected focal point detection area by calculating a sequence of defocus amounts corresponding, respectively, to sequential points in time, each defocus amount corresponding to a respective focal point detection area selected at the corresponding point in time, and driving the photographic lens to focus the subject based on the sequence of defocus amounts, irrespective of whether the selected focal point detection area has been switched to a different focal point detection area during the sequential points in time, wherein a first focal point detection area of the multiple focal point detection areas is initially selected and a second focal point detection area of the multiple focal point detection areas is sequentially selected after the first focal point detection area is selected, the sequence of defocus amounts includes a first defocus amount corresponding to the first focal point detection area when the first focal point detection area was selected, and a second defocus amount corresponding to the second focal point detection area when the second focal point detection area was selected, the focus adjustment unit determines that a subject jump has occurred when the absolute value of the difference between the defocus amount corresponding to the first focal point detection area and the defocus amount corresponding to the second focal point detection area is greater than a predetermined value and, when a subject jump has occurred, the focus adjustment unit does not drive the photographic lens to focus the subject in the second focal point detection area when the subject jump lasts for less than a predetermined time period, and drives the photographic lens to focus the subject in the second focal point detection area when the subject jump lasts for more than the predetermined time period.

* * * * *

UNITED STATES PATENT AND TRADEMARK OFFICE
CERTIFICATE OF CORRECTION

PATENT NO. : Patent No.: 5,555,068
DATED : Issue Date: 9/10/96
INVENTOR(S) : Inventor : Ken UTAGAWA It is certified that error appears in the above-indentified patent and that said Letters Patent is hereby corrected as shown below:

Col. 18, line 34, after "area" insert ---.---; delete [during the sequential points in time, without];

line 35, delete entire line;

line 36, delete entire line;

line 37, delete entire line.

Signed and Sealed this

Eighteenth Day of February, 1997

Attest:

BRUCE LEHMAN

*Attesting Officer*      *Commissioner of Patents and Trademarks*